United States Patent
Copos et al.

(10) Patent No.: US 9,552,284 B2
(45) Date of Patent: Jan. 24, 2017

(54) DETERMINING VALID INPUTS FOR AN UNKNOWN BINARY PROGRAM

(71) Applicant: FUJITSU LIMITED, Kawasaki-shi, Kanagawa (JP)

(72) Inventors: Bogdan Copos, Davis, CA (US); Praveen Murthy, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/714,072

(22) Filed: May 15, 2015

(65) Prior Publication Data
US 2016/0335175 A1 Nov. 17, 2016

(51) Int. Cl.
*G06F 9/44* (2006.01)
*G06F 11/36* (2006.01)
*G06F 9/45* (2006.01)

(52) U.S. Cl.
CPC ............ *G06F 11/3684* (2013.01); *G06F 8/71* (2013.01); *G06F 8/52* (2013.01)

(58) Field of Classification Search
CPC .............. G06F 8/52; G06F 11/36; G06F 8/71; G06F 11/3684
See application file for complete search history.

(56) References Cited

U.S. PATENT DOCUMENTS

| | | | | |
|---|---|---|---|---|
| 6,330,518 B1* | 12/2001 | Colson | ...................... | G06F 8/71 702/123 |
| 6,473,707 B1* | 10/2002 | Grey | ................... | G06F 11/3684 702/108 |
| 6,711,672 B1* | 3/2004 | Agesen | ..................... | G06F 8/52 712/227 |
| 7,873,945 B2 | 1/2011 | Musuvathi et al. | | |
| 7,908,590 B1* | 3/2011 | Min | .................... | G06F 11/3684 717/124 |

(Continued)

OTHER PUBLICATIONS

Pravin Karmore et al. "Study of Evolutionary Testing for Structural Testing of Embedded Systems", [Online] 2016, pp. 1896-1900, [Retrieved from Internet on Sep. 10, 2016], <http://ijsetr.org/wp-content/uploads/2016/06/IJSETR-VOL-5-ISSUE-6-1896-1900.pdf>.*

(Continued)

*Primary Examiner* — Thuy Dao
*Assistant Examiner* — Ziaul A Chowdhury
(74) *Attorney, Agent, or Firm* — Maschoff Brennan

(57) ABSTRACT

A method to determine valid input sequences for an unknown binary program is provided. The method includes obtaining multiple input sequences, which each include two or more different inputs, for an unknown binary program. The inputs for the input sequences may be valid inputs for the unknown binary program. The method may further include executing an instrumented version of the unknown binary program separately for each input sequence. For each execution of the instrumented version of the unknown binary program, a set of execution traces may be generated by recording execution traces generated by the execution of the instrumented version of the unknown binary program. The method may further include comparing the sets of execution traces and determining which of the input sequences the unknown binary program accepts as valid based on the comparison of the sets of execution traces.

20 Claims, 6 Drawing Sheets

(56) References Cited

U.S. PATENT DOCUMENTS

| | | | | |
|---|---|---|---|---|
| 8,307,342 | B2* | 11/2012 | Oglesby | G06F 11/3684 717/124 |
| 8,370,809 | B2* | 2/2013 | Lawrance | G06F 11/3684 717/124 |
| 8,776,026 | B2* | 7/2014 | Candea | G06F 11/3612 717/126 |
| 2003/0135843 | A1* | 7/2003 | Sluiman | G06F 11/3684 717/124 |
| 2005/0160321 | A1* | 7/2005 | Cleaveland | G06F 11/3684 714/38.1 |
| 2007/0266373 | A1* | 11/2007 | Liu | G06F 9/44589 717/126 |
| 2008/0098378 | A1* | 4/2008 | Kilbane | G06F 8/71 717/162 |
| 2008/0104573 | A1* | 5/2008 | Singla | G06F 11/3688 717/120 |
| 2009/0007077 | A1* | 1/2009 | Musuvathi | G06F 11/3688 717/130 |
| 2010/0287534 | A1* | 11/2010 | Vangala | G06F 11/3612 717/124 |
| 2012/0084759 | A1* | 4/2012 | Candea | G06F 11/3612 717/126 |
| 2012/0304010 | A1* | 11/2012 | Opstad | G06F 11/3688 714/34 |
| 2013/0019126 | A1* | 1/2013 | Frohlich | G06F 11/3688 714/38.1 |
| 2013/0086558 | A1* | 4/2013 | Merino | G06F 11/3688 717/128 |
| 2014/0109072 | A1* | 4/2014 | Lang | G06F 8/52 717/168 |
| 2016/0070640 | A1* | 3/2016 | Clark | G06F 11/3684 717/124 |

OTHER PUBLICATIONS

Atanas Rountev et al., "Data-Flow Analysis of Program Fragments", [Online], 1999, pp. 235-252, [Retrieved from Internet on Sep. 10, 2016], <http://download.springer.com/static/pdf/756/chp%253A10.1007%252F3-540-48166-4_15.pdf>.*

S K Gardikiotis et al., "Evolution and Maintenance of Database Applications", [Online], 2004, pp. 1-6, [Retrieved from Internet on Sep. 10, 2016], <https://www.researchgate.net/profile/Nicos_Malevris/publication/237818787/links/552a2c4c0cf29b22c9bf6f20.pdf>.*

Kenton McHenry et al., "Towards a Universal, Quantifiable, and Scalable File Format Converter", [Online], 2009, pp. 1-8, [Retrieved from Internet on Sep. 10, 2016], <https://isda.ncsa.illinois.edu/drupal/sites/default/files/eScience09.pdf>.*

Comparetti, P.M.; Wondracek, G.; Kruegel, C.; Kirda, E., "Prospex: Protocol Specification Extraction," Security and Privacy, 2009 30th IEEE Symposium on , vol., No., pp. 110,125, May 17-20, 2009.

Antunes, J.; Neves, N.; Verissimo, P., "Reverse Engineering of Protocols from Network Traces," Reverse Engineering (WCRE), 2011 18th Working Conference on , vol., No., pp. 169,178, Oct. 17-20, 2011.

* cited by examiner

DETERMINING VALID INPUTS FOR AN UNKNOWN BINARY PROGRAM

FIELD

The embodiments discussed herein are related to determining valid inputs for an unknown binary program.

BACKGROUND

Efficient testing of a binary program may be improved by knowledge of which inputs are valid for the binary program. The binary program may include code and routines that a human may interpret as text. However, the text included in the code and routines of the binary program are not human-readable. It is impossible for human testers of the binary program to determine valid inputs for the binary program by reviewing the code and routines of the binary program because the code and routines are not human readable. As a result, the human testers may review specifications, documentation or source code associated with the binary program in order to determine which inputs are valid for the binary program. These valid inputs may then be used to achieve more efficient testing of the binary program.

SUMMARY

According to an aspect of an embodiment, a method to determine valid input sequences for an unknown binary program is provided. The method includes obtaining multiple input sequences for an unknown binary program. Each of the input sequences may include two or more different inputs. The inputs may be determined as valid inputs of the unknown binary program. The method further includes executing an instrumented version of the unknown binary program separately for each input sequence. Each execution of the instrumented version of the unknown binary program may use one of the input sequences as inputs to the instrumented version of the unknown binary program.

For each execution of the instrumented version of the unknown binary program, a set of execution traces may be generated by recording execution traces generated by the execution of the instrumented version of the unknown binary program. The method may also include comparing the sets of execution traces and determining which of the input sequences the unknown binary program accepts as valid based on the comparison of the sets of execution traces.

The object and advantages of the embodiments will be realized and achieved at least by the elements, features, and combinations particularly pointed out in the claims.

It is to be understood that both the foregoing general description and the following detailed description are exemplary and explanatory and are not restrictive of the present disclosure, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
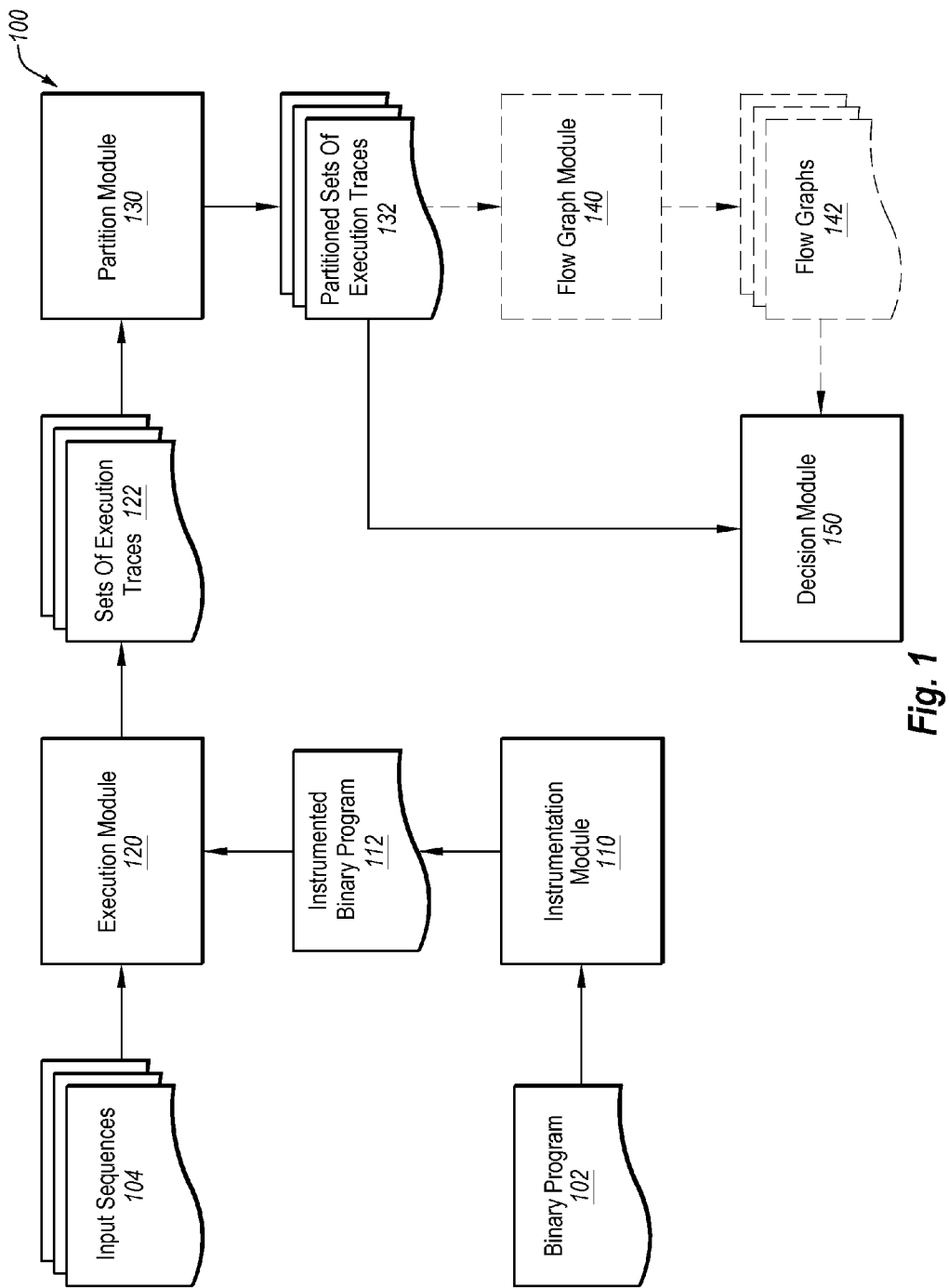
FIG. 1 illustrates an example input sequence determination process.

An acceptable method to determine valid input sequences for an unknown binary program may include various elements. One element may include covering a high percentage of the code and routines included in the unknown binary program (excluding dead code). For example, one or more test inputs or input sequences selected for testing an unknown binary program may cover one hundred percent or near one hundred percent of the code and routines for the unknown binary program (e.g., ninety percent to one hundred percent of the binary program, excluding dead code and routines). Some current methods rely on generation of random test inputs for testing the unknown binary program. Unfortunately, testing methods that include generation of random test inputs for testing an unknown binary program may be unable to consistently cover a high percentage of the code and routines for the unknown binary program because randomly generated test inputs may be inherently incompatible with the goal of consistently covering a high percentage of the code and routines for the unknown binary program. As a result, some existing methods are not able to consistently cover a high percentage of the code and routines for the binary program, and so, these methods are not considered acceptable.

Another element of an acceptable method to determine valid input sequences for an unknown binary program may include the ability to be effectively implemented without a specification, documentation, or source code associated with the unknown binary program. This requirement may be beneficial in the field of autonomous software security where it is beneficial for a computer system to automatically determine vulnerabilities in software. In some situations, the unknown binary program may be available to human testers of the unknown binary program, but the specification, documentation and source code associated with the unknown binary program may be unavailable. Some existing methods attempt to determine valid inputs for unknown binary program. However, these methods rely on randomly generated test inputs or have other deficiencies.

Yet another element of an acceptable method for determining valid input sequences for unknown binary program may include platform independence. Platform independence may beneficially improve the portability of the methodology as well as provide other benefits.

Currently, there does not appear to be a method to determine valid input sequences for an unknown binary program that includes elements discussed above. Various methods are used to determine valid input sequences for an unknown binary program. However, none of these methods provide all or even some of the elements discussed above of an acceptable method for determining valid input sequences for an unknown binary program.

One such method may be referred to as a "symbolic execution." The symbolic execution approach includes determining inputs for the unknown binary program which may drive the program along various execution paths including possibly crashing the program. This approach may be successful in some isolated instances. However, one deficiency associated with the symbolic execution approach is the use of a source file associated with the unknown binary program. In some instances, the source file may be unavailable. As a result, implementation of the symbolic execution approach may not be possible in these instances. Other deficiencies may be that the symbolic execution approach may not scale well and thus may not work with many common scenarios. For example, the symbolic execution approach has known problems working with programs that include floating point arithmetic or include non-linear constraints on the input gathered during execution of the program. For at least these reasons, the symbolic execution approach is not an acceptable method for determining valid inputs for unknown binary programs.

Another method is known as a "black-box fuzzing." This approach may include selecting a string and randomly altering the string. The string may be fed to the unknown binary program as an input after each alteration. Although this approach may work given enough time, most of the inputs generated by black-box fuzzing are invalid inputs. This is problematic since valid inputs are needed in order to mutate and identify additional valid inputs. An additional problem associated with black-box fuzzing is that this approach does not guarantee high coverage of the unknown binary programs since it is reliant on random inputs, and so, it is impossible to know whether the results of implementing black-box fuzzing achieve high coverage.

Another method is known as "white-box fuzzing." The white-box fuzzing approach is similar to black-box fuzzing, with the exception that valid inputs are used to gather symbolic constraints, which may then be analyzed to produce test inputs. The white-box fuzzing approach may be considered an improvement over black-box fuzzing since it includes at least some inputs that are not arrived at randomly. However, the white-box approach requires valid inputs as a prerequisite before it may be implemented to determine test input. In some instances valid inputs will not be available as seeds for the white-box fuzzing approach. For this reason, the white-box fuzzing approach implemented alone may be unable to solve the problem of determining valid inputs for an unknown binary program.

Another method is known as "unit testing," in which the code for a program is divided into units and tested systematically. Although unit testing may be able to achieve high coverage testing of a binary program in some instances, this approach always requires source files or other documentation associated with the binary program such as the specification for the binary program. Without this information, unit testing may not be implemented. As such, the unit testing approach is unable to solve the problem of determining valid inputs for an unknown binary program because it requires source files or some other documentation. Another deficiency associated with the unit testing approach is that it is platform dependent. The unit testing approach is also considered to be slow and expensive.

Another method is known as "specification-based testing". However, as the name implies, the specification-based testing approach always requires source files or other documentation associated with an unknown binary programs. As such, this approach is unable to solve the problem of determining valid inputs for an unknown binary program because it requires source files or some other documentation. Similar to unit testing, the specification-based testing approach is also platform dependent and considered to be slow and expensive.

Other methods may include "reverse code engineering." These approaches may include: the "information exchange analysis" approach; the "disassembly" approach; and the "decompilation" approach. The information exchange analysis approach may not be effective if no information is exchanged by an unknown binary program, and so, this approach is limited and not acceptable for this reason. The disassembly approach relies on a static or dynamic analysis of raw assembly code, which has a number of deficiencies. For example, static or dynamic analysis of raw assembly code is computationally expensive, imprecise, does not scale well and likely to introduce significant performance overheads. The decompilation approach attempts to reconstruct the source code associated with an unknown binary program and proceed with the testing using the source code and the unknown binary program. However, in practice the decompilation approach does not work in many situations and may render a source code file that is unusable or not high quality because in actuality it differs substantially from the original source code file it attempts to reconstruct.

Some embodiments discussed in this disclosure are related to systems and/or methods to determine valid input sequences for an unknown binary program. In these and other embodiments, a valid input sequence may be a sequence of two or more input commands and arguments. By determining the valid input sequences for the unknown binary program, the unknown binary program may be tested without any knowledge of the unknown binary program.

In some embodiments, valid input sequences for the unknown binary program are determined based on executing the unknown binary program with multiple sequences of inputs. During the execution of the unknown binary program using the multiple sequences of inputs, a set of execution traces of the unknown binary program may be recorded during execution of each of the multiple sequences of inputs. The sets of executions traces may be compared. Based on the comparison, it may be determined whether a particular input sequence is likely a valid input sequence for an unknown binary program that causes the unknown binary program to move to a new state.

In some embodiments, the systems and/or methods described in this disclosure may not rely on random input generation. In this way, the systems and/or methods described in this disclosure may achieve high coverage of an unknown binary program using valid input sequence. By comparison, other techniques that rely on random input generation, such as black-box fuzzing and others may be unable to achieve high coverage of the unknown binary program.

In some embodiments, the systems and/or methods described in this disclosure may also be platform independent. As a result, the systems and/or methods described in this disclosure may be portable and used in a variety of operating environments. In some embodiments, the systems and/or methods described in this disclosure may also be successfully implemented without source code or documentation associated with an unknown binary program. In some embodiments, the systems and/or methods described in this disclosure may also be implemented without packet sniffing, bus analysis or any other methodology that relies on information exchange. As a result, the systems and/or methods described in this disclosure may be implemented without the use of reverse code engineering techniques.

FIG. 1 illustrates an example input sequence determination process 100, arranged in accordance with at least one embodiment described in this disclosure. In some embodiments, the process 100 may use an instrumentation module 110, an execution module 120, a partition module 130, and a decision module 150 to determine a valid sequence for inputs to an unknown binary program 102. Alternately or additionally, the process 100 may also use a flow graph module 140.

The instrumentation module 110 may be configured to receive an unknown binary program 102. The unknown binary program 102 may be an entire binary program or a partial binary program, such as one or more functions or other aspects of a program. In these and other embodiments, the unknown binary program 102 may include a compiled version of a program. The program may include code and routines describing the functionality of the program. The code and routines of the program may define inputs that may be valid for the program and the unknown binary program 102 which is a compiled version of the program. In some embodiments, the inputs for the program may include one or more input strings. An input not defined as valid by the code and routines may be an invalid input for the program and thus for the unknown binary program 102.

In some embodiments, the unknown binary program 102 may be a stateful program. In these and other embodiments, a stateful program may be a program that includes memory of the past. In a stateful program, previous transactions may be remembered and may affect the current transaction. For example, information about previous data inputs received may be stored in variables and used to affect the processing of a current data input. As a stateful program, the program may not be a stateless program. In these and other embodiments, a stateless program may be a program that includes no memory of the past. As a result, every request or transactions may be an independent request or transition that may be performed by the program as if it were being done for the very first time and unrelated to previous requests or transactions. Thus, subsequent inputs are independent of other inputs, and previous inputs do not affect the subsequent results or program response.

The unknown binary program 102 may include code and routines encoded in binary form and stored on a non-transitory computer-readable storage medium for execution by a processing device. Although the code and routines of the unknown binary program 102 may include portions that may be interpreted by a human as text, the code and routines of the unknown binary program 102 may not be human-readable. In these and other embodiments, the code and routines may be machine readable. For example, the code and routines may be binary or some other machine readable format.

The unknown binary program 102 may be "unknown" because valid inputs for the unknown binary program 102 may be unknown. For example, the specification, documentation, or source code associated with the unknown binary program 102 may not be available to a human tester or other testing equipment of the unknown binary program 102. As a result, the human tester or other testing equipment tester may not be able to determine valid inputs for the unknown binary program 102.

The instrumentation module 110 may be configured to generate an instrumented binary program 112 based on the unknown binary program 102. In these and other embodiments, to generate the instrumented binary program 112, the instrumentation module 110 may instrument the unknown binary program 102. To instrument the unknown binary program 102, the instrumentation module 110 may input additional code instructions in the unknown binary program 102. The additional code instructions may output information about the execution or run time of the unknown binary program 102. The additional information output by the additional code instructions in the instrumented binary program 112 may be execution traces of the instrumented binary program 112. For example, in some embodiments, the execution traces may include information about memory addresses, register values, function calls, threads, and interrupt signals, among other things during the execution of the unknown binary program 102.

As another example, an execution trace may be a starting memory address of a block of instructions performed by the unknown binary program 102. A block of instructions performed by the unknown binary program 102 may be a set of instructions with a single entry instruction and a single exit instruction. In these and other embodiments, a set of instructions with a single entry instruction and a single exit instruction may be a straight-line block of instructions in the unknown binary program 102 without any jumps or jump targets.

In some embodiments, the execution traces may be output as a function of time. For example, the execution traces may be output in an order of execution over time. Thus, when a first block of instructions is executed at a first time, a first execution trace may be a record of the execution of the first block of instructions at the first time. A second block of instructions may be executed at a second time and a second execution trace may be a record of the execution of the second block of instructions at the second time. The first block of instructions may again be executed at a third time and a third execution trace may be record of the execution of the third block of instructions at the third time. In these and other embodiments, the second block of instructions may be ahead of the first block of instructions in a listing of the unknown binary program 102, but the time of execution may be used for ordering the execution traces in place of a listing of instructions in the unknown binary program 102.

In these and other embodiments, the execution traces may be information that is output by the instrumented binary program 112 that would not be output by the unknown binary program 102 without instrumentation of the unknown binary program 102. Thus, the execution traces result from the instrumentation of the unknown binary program 102 and are not normal outputs of the unknown binary program 102.

In some embodiments, the instrumentation module 110 may include a binary instrumentation program, such as PIN or some other binary instrumentation program. The instrumentation module 110 may provide the instrumented binary program 112 to the execution module 120.

The execution module 120 may be configured to receive the instrumented binary program 112 and the input sequences 104. In some embodiments, the input sequences 104 may each include two or more different inputs for the unknown binary program 102. In some embodiments, inputs for the unknown binary program 102 may have been previously discovered and determined to be valid inputs for the unknown binary program 102. Having determined the input for the unknown binary program 102, however, does not indicate a valid sequence for providing the inputs to the unknown binary program 102. For example, it may be discovered that the unknown binary program 102 recognizes four different inputs. After receiving one of the inputs, the unknown binary program 102 may expect another or the same one of the inputs. In these and other embodiments, there may be sixteen different two-input long sequences of the inputs that may be provided to the unknown binary program 102. The process 100 may be configured to determine which of the sixteen different two-input long sequences of the inputs are valid input sequences for the unknown binary program 102.

In some embodiments, after determining a valid two-input long sequence, the process 100 may determine if there are valid three-input long, four-input long, or five-input long sequences or other lengths of sequences. In some embodiments, as noted above the unknown binary program 102 may be a stateful program. In these and other embodiments, after entering another state by entering an input or sequence of inputs, additional inputs for the unknown binary program 102 may be discovered. In these and other embodiments, the process 100 may use the additional inputs when determining valid inputs sequences.

In some embodiments, the two or more different inputs in a sequence may be ordered, such that the inputs are provided to the unknown binary program 102 in their associated order. For example, a first input in one of the input sequences 104 may be provided to the unknown binary program 102 first and a second input in the one of the input sequences 104 may be provided to the unknown binary program 102 second.

In some embodiments, the inputs used for the input sequences 104 may each include a command for the unknown binary program 102 and an argument associated with the command. The arguments may be expected by the unknown binary program 102 after receiving the command. For example, a command may be a "call" command in the unknown binary program 102 that results in the unknown binary program 102 calling a particular function. In these and other embodiments, the argument associated with the "call" command may be an internal function of the unknown binary program 102 that may be called at that point of execution of the unknown binary program 102. As another example, the command in the unknown binary program 102 may be an "authorize" command that allows for increased functionality in the unknown binary program 102. In these and other embodiments, the argument of the "authorize" command may be a token or password used by the unknown binary program 102 to allow the unknown binary program 102 to execute other processes of the unknown binary program 102. A further description of how to determine a valid command and argument for an input sequence may be described with respect to FIG. 4. Alternately or additionally, a further description of a construction of the input sequences 104 may be described with respect to FIG. 4.

The execution module 120 may be configured to execute the instrumented binary program 112 separately for each of the input sequences 104. In these and other embodiments, each execution of the instrumented binary program 112 may be performed using one of the input sequences 104 as inputs for the instrumented binary program 112. For example, if there are three input sequences 104, the execution module 120 may execute the instrumented binary program 112 three times, once for each of the three input sequences 104.

During each execution of the instrumented binary program 112 using one of the input sequences 104, the execution module 120 may be configured to record execution traces generated by the instrumented binary program 112. The execution module 120 may thus generate multiple sets of execution traces 122. Each of the sets of execution traces 122 may be generated for one execution of the instrumented binary program 112. For example, the execution traces generated during one execution of the execution module 120 using one of the input sequences 104 may form one of the sets of execution traces 122. Thus, each set of the sets of execution traces 122 may correspond and be associated with the one of the input sequences 104.

The execution traces in the sets of the execution traces 122 may be records of the execution of basic blocks of instructions in the instrumented binary program 112. In some embodiments, an execution trace may be include or be associated with a number, such as a number of a memory location associated with one or more blocks of instructions that are executed. For example, a block may be a straight-line piece of code without any jumps or jump targets that begins executing at the memory location associated with the execution trace. In these and other embodiments, another execution trace may begin when the code jumps to another memory location. The next execution trace may include or be associated with the other memory location. The sets of execution traces 122 may be provided to the partition module 130.

The partition module 130 may be configured to receive the sets of the execution traces 122. In some embodiments, the partition module 130 may be further configured to partition each of the sets of the execution traces 122. In these and other embodiments, partitioning each of the sets of the execution traces 122 may include determining a partition location for each of the sets of the execution traces 122.

To determine a partition location, the partition module 130 may locate a particular execution trace or sequence of execution traces in each of the sets of the execution traces 122. The particular execution trace or sequence of execution traces may be the partition location. In some embodiments, the particular execution trace or sequence of execution traces may be determined based on executing the instrumented binary program 112 without providing the instrumented binary program 112 with any inputs. In these and other embodiments, the particular execution trace or sequence of execution traces may be a last execution trace or a sequence of the last execution traces logged during the execution of the instrumented binary program 112. For example, the sequence of the last execution traces may be 2, 3, 4, 5, 6, or more execution traces. In these and other embodiments, the particular execution trace or sequence of execution traces may be referred to as a partition flag.

In some embodiments, the partition flag may be an indication that the binary program 112 is expecting an input. For example, when the partition flag is a last execution trace or sequence of the last execution traces logged during the execution of the instrumented binary program 112. The partition flag being the last execution trace or sequence of the last execution traces logged may indicate that the instrumented binary program 112 is stopped and waiting for an input before continuing. In these and other embodiments, the partition flag may thus indicate locations in each of the sets of execution traces 122 where the instrumented binary program 112 begins and stops acting on a particular input. For example, the instrumented binary program 112 may execute based on a sequence of two inputs. The execution traces generated by the execution may include three instances of the partition flag. Between the start of the execution traces and the first instance of the partition flag may indicate execution of the instrumented binary program 112 before receiving the first input. Between the first instance of the partition flag and the second instance of the partition flag may indicate execution of the instrumented binary program 112 during and after reception of the first input and before reception of the second input. Between the second instance of the partition flag and the third instance of the partition flag may indicate execution of the instrumented binary program 112 during and after reception of the second input.

The partition module 130 may review each of the sets of execution traces 122 individually to determine the location of the partition flag. In some embodiments, the partition flag may occur multiple times. The location of the partition flag in the sets of the execution traces 122 may be a partition location. The partition module 130 may partition the set of execution traces 122 based on their corresponding partition locations to generate partitioned sets of execution traces 132. For example, for a sequence of two inputs, a set of execution traces may be partitioned into three portions. The first portion may correspond to when no inputs are received by the instrumented binary program 112. The second portion may correspond to when the first input is received and acted on by the instrumented binary program 112 and the third portion may correspond to where the second input is received and acted on by the instrumented binary program 112. The partition module 130 may send the partitioned sets of execution traces 132 to the decision module 150.

The decision module 150 may receive the partitioned sets of execution traces 132 from the partition module 130. The decision module 150 may be configured to compare the partitioned sets of execution traces 132. Based on the comparison of the partitioned sets of execution traces 132, the decision module 150 may determine which, if any, of the input sequences 104 the unknown binary program may accept as valid.

In some embodiments, the decision module 150 may compare all of the partitioned sets of execution traces 132. Alternately or additionally, the decision module 150 may compare the partitioned sets of execution traces 132 that are generated based on the execution of the same inputs to the instrumented binary program 112. For example, the decision module 150 may compare the last partitions of the partitioned sets of executed traces 132 that correspond with the execution of the last inputs of each input sequence. If the last input is determined to be valid, it may suggest that the entire input sequence is a proper input sequence. Thus, in these and other embodiments, the last partitions of the partitioned sets of execution traces 132 corresponding to the last inputs may be compared and the partitions of the partitioned sets of execution traces 132 may not be compared.

In these and other embodiments, when the comparison of the last partitions of the partitioned sets of execution traces 132 indicates that the last partitions are all the same, none of the input sequences may be determined to be accepted by the unknown binary program 102 as sequential inputs. When all of the last partitions are the same, it may indicate that the unknown binary program 102 treated all of the last inputs in the same manner. Treating each last input in the same manner may indicate that the unknown binary program 102 did not accept any of the last inputs as valid inputs. Thus, all of the last inputs may be invalid.

In some embodiments, when the comparison of the last partitions of the partitioned sets of execution traces 132 indicates at least another two of the last partitions are the same and one or more other last partitions are different from the two of the last partitions that are same, it may be determined that input sequences used to generate the one or more of the last partitions is accepted by the unknown binary program 102 as valid input sequences. When some of the last partitions are different from other of the last partitions that are the same, it may indicate that the unknown binary program 102 treated some of the last inputs in a different manner. Treating some of the last inputs in a different manner may indicate that the unknown binary program 102 accepted some and did not accept others of the last input sequences. The unaccepted inputs may tend to be processed the same by the unknown binary program 102, but the accepted last inputs may each be processed differently by the unknown binary program 102. Thus, some of the last inputs may be valid and others invalid.

In some embodiments, the process 100 may include the flow graph module 140. In these and other embodiments, partition module 130 may send the partitioned sets of execution traces 132 to the flow graph module 140 instead of the decision module 150.

Figure 3:
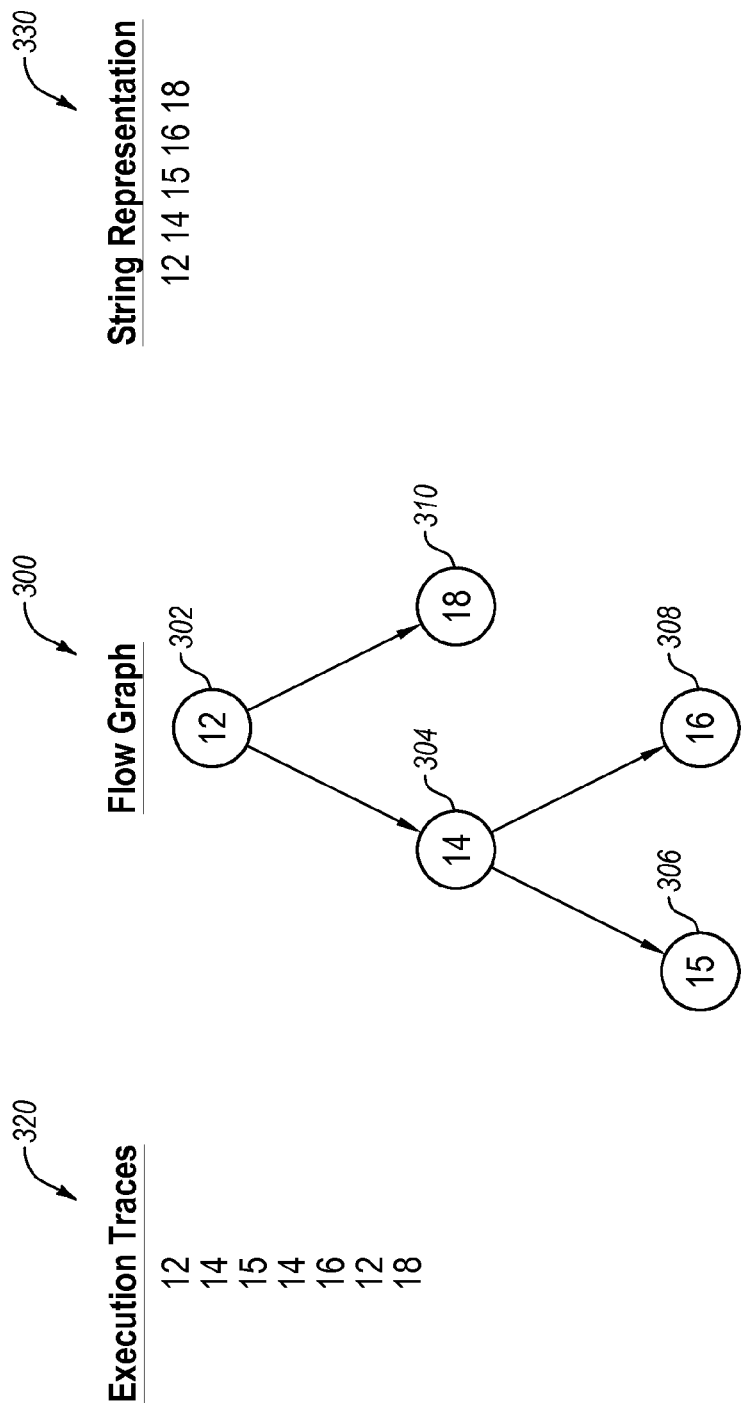
FIG. 3 illustrates an example control flow graph and an example string representation of the control flow graph.

The flow graph module 140 may be configured to receive the partitioned sets of execution traces 132 from the partition module 130. The flow graph module 140 may be further configured to determine a control flow graph for each partition of each of the partitioned sets of execution traces 132. A control flow graph may represent the paths traversed by the execution of the instrumented binary program 112 based on the sets of execution traces 122. A control flow graph is illustrated in FIG. 3. In general, a control flow graph includes nodes linked by edges. In some embodiments, the nodes may represent a single execution trace that represents a block of straight-line code. Jumps or changes between different blocks of straight-line code may be represented by the edges. In these and other embodiments, one or more of the execution traces may be represented by a node and the edges may represent a change to a next execution trace or traces. The flow graph module 140 may send the control flow graphs 142 to the decision module 150.

Figure 2:
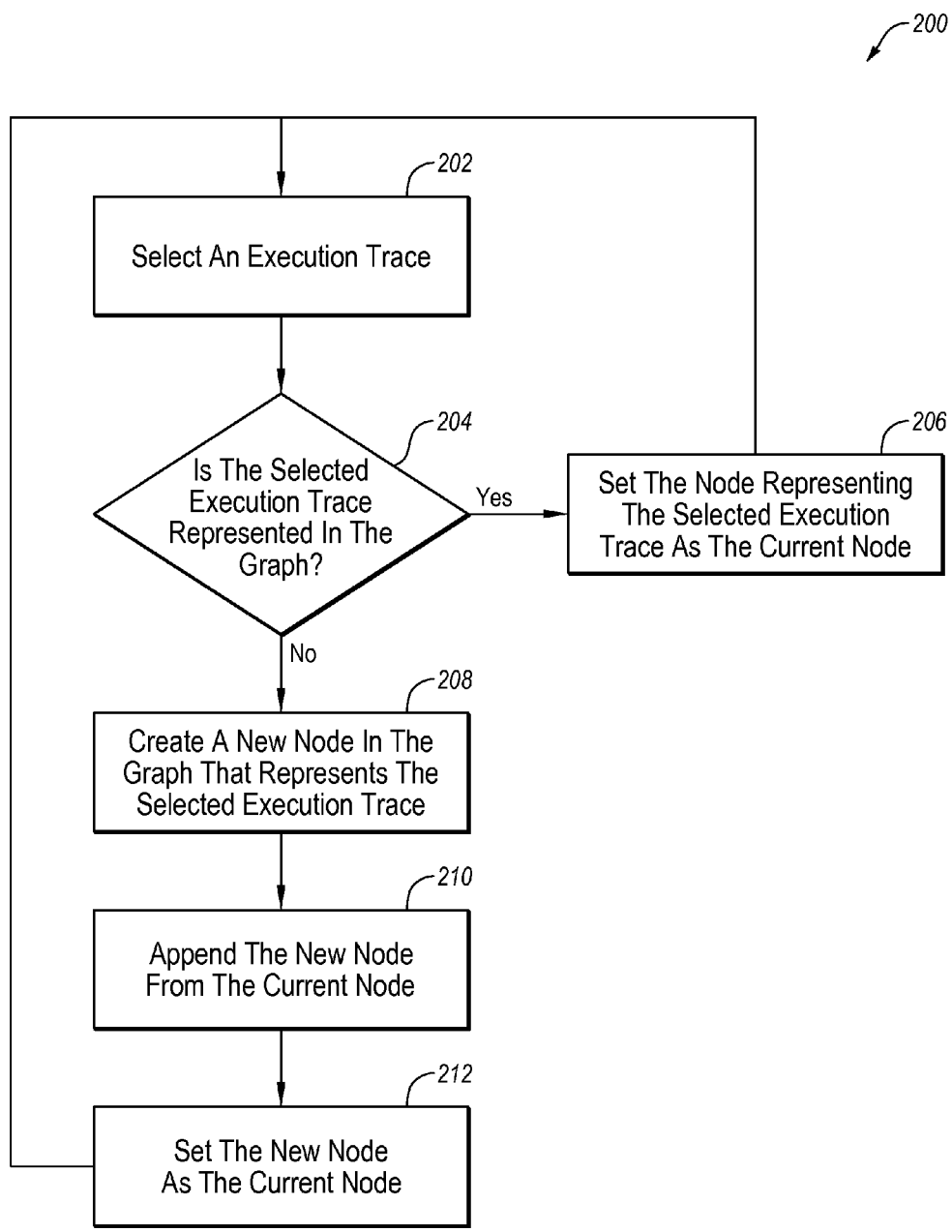
FIG. 2 is a flow chart of an example method to construct a control flow graph.

FIG. 2 illustrates an example method 200 to construct a control flow graph for each partition of each of the partitioned sets of execution traces, which may be arranged in accordance with at least one embodiment described herein. The method 200 may be implemented, in some embodiments, by a system, such as the system 500 of FIG. 5. Although illustrated as discrete blocks, various blocks may be divided into additional blocks, combined into fewer blocks, or eliminated, depending on the desired implementation.

The method 200 may begin at block 202, where an execution trace may be selected. In some embodiments, the first execution trace selected may be a first execution trace of a partition from one set of the partitioned sets of execution traces 132. After the first execution trace is selected, the selection of a second and subsequent execution trace may be based on a next execution trace in the sequence of the executions traces of the partition.

In block 204, it may be determined if the selected execution trace is represented in the graph. When the selected execution trace is represented in the graph, the method 200 may proceed to block 206. When the selected execution trace is not represented in the graph, the method 200 may proceed to block 208. In some embodiments, the selected execution trace may be represented in the graph when the execution trace includes or is associated with a memory location that is the same or similar to a memory location associated with or included with a node already in the graph.

In block 206, the node already in the graph that represents the selected execution trace in the graph may be set as the current node. The method 200 may return to block 202 and another execution trace may be selected from the partitioned sets of execution traces 132.

In block 208, a new node may be created that represents the selected execution trace. In block 210, the new node may be appended from the current node by an edge. When the new node is the first node, the new node may not be appended from the current node, because the new node may be the first node in the control flow graph.

In block 212, the new node may be set as the current node. The method 200 may return to block 202 and another execution trace may be selected from the partitioned sets of execution traces 132.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

An example control flow graph 300, which may be arranged in accordance with at least one embodiment described herein, is illustrated in FIG. 3. The control flow graph 300 may be constructed based on the execution trace list 320 also illustrated in FIG. 3. The execution trace list 320 may include seven recorded execution traces numbered 12, 14, 15, 14, 16, 12, and 18. The control flow graph 300 may include five nodes, a first node 302, a second node 304, a third node 306, a fourth node 308, and a fifth node 310.

An example execution of the method 200 using the seven recorded execution traces from the execution trace list 320 to build the control flow graph 300 is now provided. The first execution trace, numbered 12, may be selected. Being the first execution trace a new node, the first node 302 may be created and may be set as the current node. The second execution trace, numbered 14 may be selected. It is different from execution trace represented by the first node 302, thus a new node is created, the second node 304. The second node 304 is appended to the current node, which is the first node 302. The second node 304 is set as the current node.

The third execution trace, numbered 15 may be selected. It is different from execution trace represented by the first node 302 or the second node 304, thus a new node is created, the third node 306. The third node 306 is appended to the current node, which is the second node 304. The third node 306 is set as the current node.

The fourth execution trace, numbered 14 may be selected. It is the same as the execution trace represented by the second node 304, thus the second node 304 is set as the current node and another execution trace is selected.

The fifth execution trace, numbered 16 may be selected. It is different from execution trace represented by the first node 302, the second node 304, or the third node 306 thus a new node is created, the fourth node 308. The fourth node 308 is appended to the current node, which is the second node 304. The fourth node 308 is set as the current node.

The sixth execution trace, numbered 12 may be selected. It is the same as the execution trace represented by the first node 302, thus the first node 302 is set as the current node and another execution trace is selected.

The seventh execution trace, numbered 18 may be selected. It is different from execution trace represented by the other nodes and thus a new node is created, the fifth node 310. The fifth node 310 is appended to the current node, which is the first node 302. The fifth node 310 is set as the current node.

Returning to FIG. 1, the decision module 150 may receive the control flow graphs 142 from the flow graph module 140. The decision module 150 may be configured to compare the control flow graphs 142. Based on the comparison of the control flow graphs 142, the decision module 150 may determine which, if any, of the input sequences 104 the unknown binary program may accept as valid.

In some embodiments, the decision module 150 may compare all of the control flow graphs from the flow graph module 140. Alternately or additionally, the decision module 150 may compare the control flow graphs that correspond to partitions of the sets of execution traces 132 that are generated based on the execution of the same inputs to the instrumented binary program 112. For example, the decision module 150 may compare the control flow graphs 142 that are generated for the last partitions of the partitioned sets of executed traces 132 that correspond with the execution of the last inputs of each input sequence. If the last input is determined to be valid, it may suggest that the entire input sequence is a proper input sequence. Thus, in these and other embodiments, the control flow graphs 142 corresponding to the last inputs may be compared and the control flow graphs 142 corresponding to other inputs may not be compared.

In these and other embodiments, when the comparison of the control flow graphs 142 indicates that the control flow graphs 142 for the last inputs of each input sequence are all the same, none of the input sequences may be determined to be accepted by the unknown binary program 102 as sequential inputs. When all of the control flow graphs 142 are the same, it may indicate that the unknown binary program 102 treated all of the last inputs in the same manner. Treating each last input in the same manner may indicate that the unknown binary program 102 did not accept any of the last inputs as valid inputs. Thus, all of the last inputs may be invalid.

In some embodiments, when the comparison of the control flow graphs 142 for the last inputs of each input sequence may indicate at least another two of the control flow graphs 142 are the same and one or more other control flow graphs 142 are different from the two of the control flow graphs 142 that are same, it may be determined that input sequences used to generate the one or more of the control flow graphs 142 is accepted by the unknown binary program 102 as valid input sequences. When some of the control flow graphs 142 are different from other of the control flow graphs 142 that are the same, it may indicate that the unknown binary program 102 treated some of the last inputs in a different manner. Treating some of the last inputs in a different manner may indicate that the unknown binary program 102 accepted some and did not accept others of the last input sequences. The unaccepted inputs may tend to be processed the same by the unknown binary program 102, but the accepted last inputs may each be processed differently by the unknown binary program 102. Thus, some of the last inputs may be valid and others invalid.

In some embodiments, the decision module 150 may be configured to generate a string representation for each of the control flow graphs 142. In these and other embodiments, the string representations of the control flow graphs may be compared in place of comparing the control flow graphs directly. In these and other embodiments, the string representation of a control flow graph may include a string that includes the nodes of the control flow graph in a systematic traversal of the control flow graph. Various algorithms for systematic traversal of a control flow graph include, depth-first searches, breadth first searches, among other types of methods to systematically traverse a control flow graph.

FIG. 3 illustrates an example string representation 330 of the control flow graph 300, which is arranged in accordance with at least one embodiment described herein. The string representation 330 includes all of the different values from the execution trace list 320 in the sequential order of the execution trace list 320. An example of generating the string representation 330 follows. The string representation 330 begins at the first node 302 and records the first node 302. The string representation 330 proceeds to the left and records the second node 304. The string representation 330 continues to proceed to the left and records the third node 306. Because the string representation 330 cannot proceed to the left, the string representation 330 proceeds up the control flow graph 300 to the third node 306 and then proceeds to the right to the fourth node 308. Because the string representation 330 cannot proceed to the right or left or already has proceeded to the right and left, the string representation 330 proceeds to the first node 302 and to the right to the fifth node 310 to complete the string representation 330.

Modifications, additions, or omissions may be made to the process 100 without departing from the scope of the present disclosure. For example, in some embodiments, the partition module 130 may send the partition locations for each of the sets of the execution traces 122 and the sets of execution traces 122 to the flow graph module 140 and not partition the sets of execution traces 122. In these and other embodiments, the flow graph module 140 may partition the sets of execution traces 122.

Alternately or additionally, the partition module 130 may send one or more partitions for each of the sets of the execution traces 122 to the flow graph module 140 and not all of the partitions for each of the sets of the execution traces 122 to the flow graph module 140. For example, in these and other embodiments, the partition module 130 may send last partitions for each of the sets of the execution traces 122. In these and other embodiments, the control flow graphs 142 may include the last partitions for each of sets of the execution traces 122.

Figure 4:
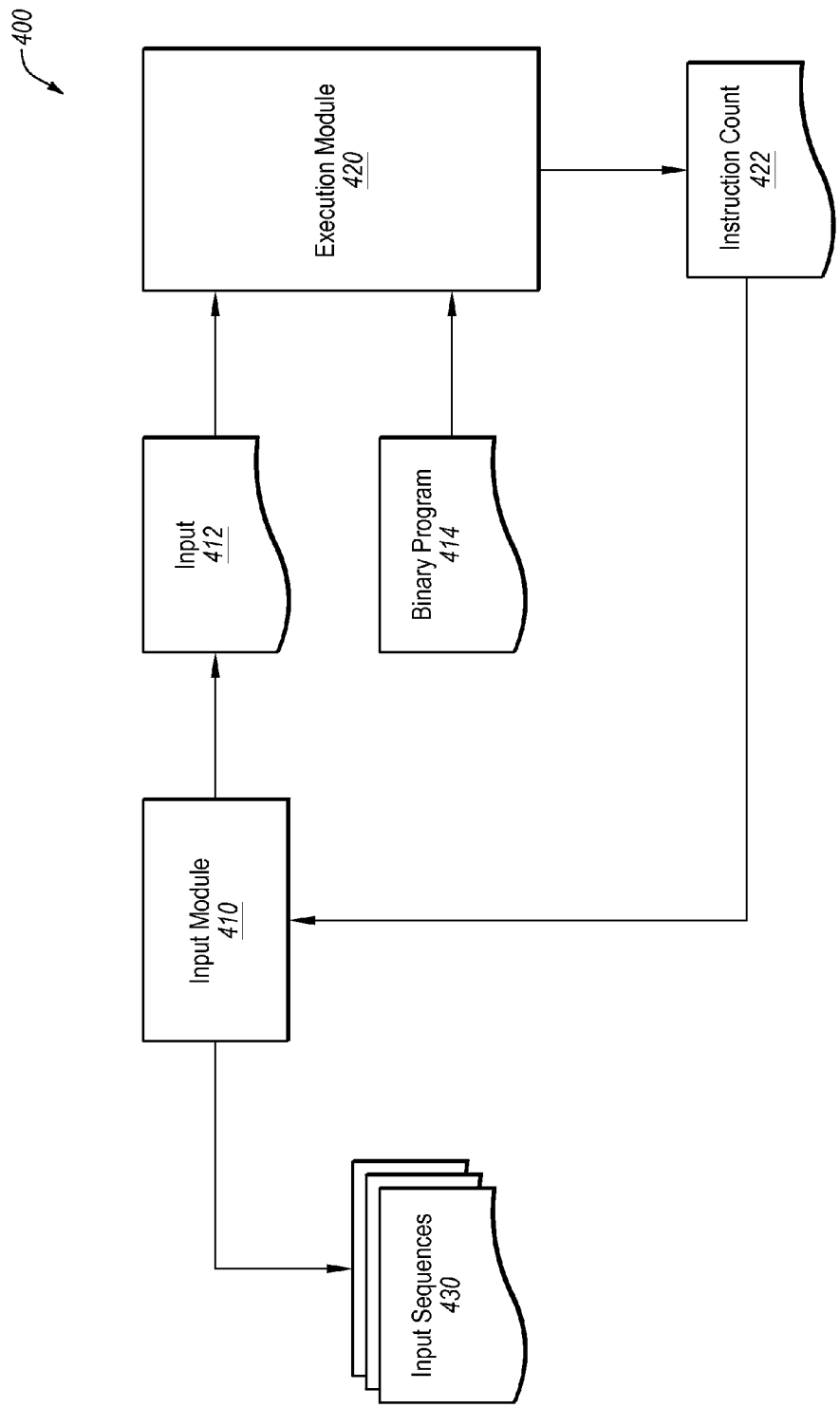
FIG. 4 illustrates an example input determination process.

FIG. 4 illustrates an example input determination process 400, which may be arranged in accordance with at least one embodiment described herein. The process 400 may use an input module 410 and an execution module 420 to determine inputs 412 for an unknown binary program 414 and input sequences 430 for the unknown binary program 414. A system and method to determine the valid inputs for a given state in the unknown binary program 414 is described in co-pending U.S. patent application Ser. No. 14/620,106 filed on Feb. 11, 2015, which is incorporated by reference in its entirety in this disclosure.

In some embodiments, the process 400 may determine inputs 412 for a state of the unknown binary program 414. In some embodiments, the inputs 412 may be one or more printable characters in an input string which may include one or more indices. An input string for the program may include one or more indices and one or more printable characters. An index may include the position in the string at which the printable character occurs. For example, if the input strings that are accepted are "Hello" and "Howdy," then the indices are "0," "1," "2," "3," and "4." In this example, the valid character at index "0" includes the printable character "H." The valid characters at index "1" include the printable characters "e" and "o." The valid characters at index "2" include "l" and "w." The valid characters at index "3" include "l" and "d." The valid characters at index "4" include "o" and " " y.

To be considered a valid input string, each of the characters included in the input string may be valid for the unknown binary program 414. For any given index of the valid input string, a majority of the printable characters available for use in the input string may be invalid. The process 400 may be configured to iteratively test a set of printable characters to determine if they are valid characters for different indexes of a valid input string for the unknown binary program 414.

The input module 410 may be configured to select and provide printable characters to the execution module 420 as the input 412. The execution module 420 may execute the unknown binary program 414 using the first printable character as the input 412. The execution module 420 may record a number of instructions performed by the unknown binary program 414 during the execution of the unknown binary program 414 using the input 412. The number of performed instructions may be output by the execution module 420 as the instruction count 422. The instruction count 422 may be provided to the input module 410.

The input module 410 may determine whether the instruction count 422 is above a threshold range. The input module 410 may determine that the first printable character may be a candidate for inclusion as a valid input in a state for the unknown binary program 414 when the instruction count 422 is above the threshold range. The input module 410 may determine that the first printable character may not be a candidate for inclusion as a valid input in the first state for the unknown binary program 414 when the instruction count 422 is below or equal to the threshold range.

The threshold range may be determined based on a mode of the number of executed instructions and a testing constant. The mode may include the mode for the number of executed instructions. For example, the number of executed instructions may be stored in a set. The set may include one or more number values. The number values may represent the number of instructions executed for each input provided by the input module 410. For example, assume that a first input resulted in one hundred instructions being executed. The number value for the first input may be the number "one hundred." The set may include other number values for other inputs. The mode may include the number value that appears most often in the set.

The testing constant may be referred to as "epsilon" or "the testing constant." The testing constant may include any positive real number. The upper limit of the threshold range may be determined by adding the testing constant to the mode.

When the first printable character is not a candidate for the valid input in the state for the unknown binary program 414, the input module 410 may provide a second printable character to the execution module 420 for execution. In a similar manner, the input module 410 may determine if the second printable character is a candidate for inclusion as a valid input in the state for the unknown binary program 414. The process 400 may continue to operate as indicate until the input module 410 determines a character that is a candidate for inclusion in a valid input in a state of the unknown binary program 414.

The input module 410 may concatenate another character with the candidate character to form the input 412. In particular, the input module 410 may place the first candidate character in a first index location and the other character in a second index location. In these and other embodiments, the concatenation of the candidate character and the other character may be referred as a partial valid input. The input module 410 may provide the input 412 to the execution module 420.

The execution module 420 may execute unknown binary program 414 using the input 412. Based on the execution of the unknown binary program 414, the execution module 420 may output the instruction count 422. The input module 410 may determine if the other character in the second index location may be a candidate for inclusion in the valid input in a state for the unknown binary program 414 based on the instruction count 422.

The process 400 may continue in a similar manner until all or a majority of valid inputs that may be determined by the process 400 for a state of the unknown binary program 414 is determined.

In some embodiments, the input module 410 may combine the valid inputs to form the input sequences 430. In some embodiments, the input module 410 may form sets of input sequences 430. Each of the sets of input sequences may include inputs sequences 430 with the last inputs being the same and the remaining inputs in each sequence being different.

In some embodiments, the inputs for the input sequences 430 may be commands and their associated arguments In these and other embodiments, the process 400 may determine a valid argument for a command in a similar manner as a command is found except the process 400 may provide the command as an input along with the possible printable characters to determine a valid argument for a given command.

In some embodiments, the input module 410 may construct all possible input sequence permutations of a prescribed input sequence length for determined valid inputs and may provide all of the input sequence permutations as the input sequences 430. In these and other embodiments, a process, such as the process 100 of FIG. 1, may determine which of the input sequences 430 are valid input sequences for the unknown binary program 414. In these other embodiments, the process may execute each of the input sequences 430, partition in resulting execution traces, generates control flow graphs, and compare the control flow graphs to determine which of the input sequences 430 are valid. In some embodiments, the process may compare control flow graphs for input sequences with the same last input to determine which of the input sequences 430 are valid. In some embodiments, the after determining a valid input sequence, the process 400 may use the valid input sequence as a beginning of the input 412 to discover additional input for the unknown binary program 414. In these and other embodiments, the additional inputs may be used to generate additional input sequences 430, which may then be provided to a process, such as the process 100 of FIG. 1. In this manner, the process 400 and a process similar to the process 100 of FIG. 1 may be used together. Modifications, additions, or omissions may be made to the process 400 without departing from the scope of the present disclosure.

Figure 5:
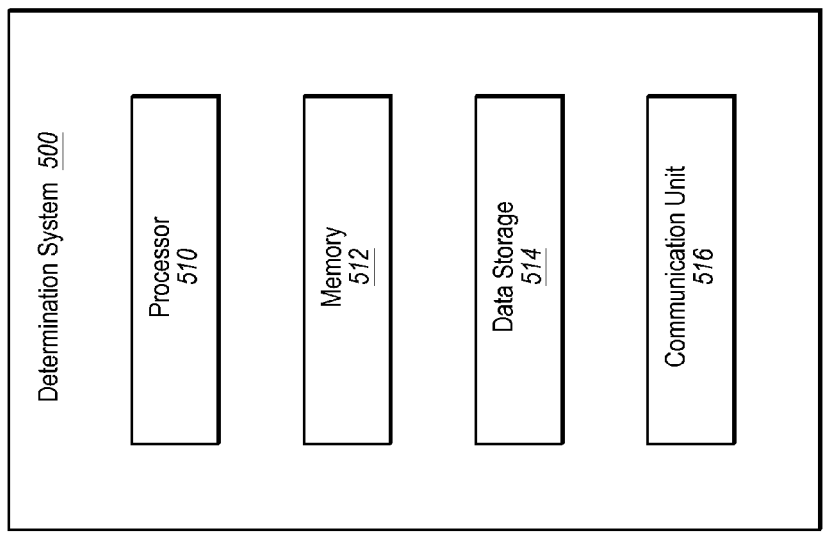
FIG. 5 is a block diagram of an example input determination system.

FIG. 5 is a block diagram of an example input determination system 500, which may be arranged in accordance with at least one embodiment described herein. As illustrated in FIG. 5, the system 500 may include a processor 510, a memory 512, a data storage 514, and communication unit 516

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DS), an application-specific integrated circuit (ASIC), a Field-Programmable Gate Array (FPGA), or any other digital or analog circuitry configured to interpret and/or to execute program instructions and/or to process data. Although illustrated as a single processor in FIG. 5, it is understood that the processor 510 may include any number of processors distributed across any number of network or physical locations that are configured to perform individually or collectively any number of operations described herein. In some embodiments, the processor 510 may interpret and/or execute program instructions and/or process data stored in the memory 512, the data storage 514, or the memory 512 and the data storage 514. In some embodiments, the processor 510 may fetch program instructions from the data storage 514 and load the program instructions in the memory 512. After the program instructions are loaded into the memory 512, the processor 510 may execute the program instructions, such as instructions to perform the process 100, the process 400, and/or the method 600 of FIGS. 1, 4, and 6, respectively.

The memory 512 and the data storage 514 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 516 may be configured to receive an unknown binary program and to provide the unknown binary program to the data storage 514. After being received by the data storage 514, inputs and input sequences for the unknown binary program using the processor 510 and instructions stored in the data storage. In some embodiments, determined inputs and input sequences may be provide outside the system 500 using the communication unit 516.

Modifications, additions, or omissions may be made to the system 500 without departing from the scope of the present disclosure. For example, the data storage 514 may be located in multiple locations and accessed by the processor 510 through a network.

Figure 6:
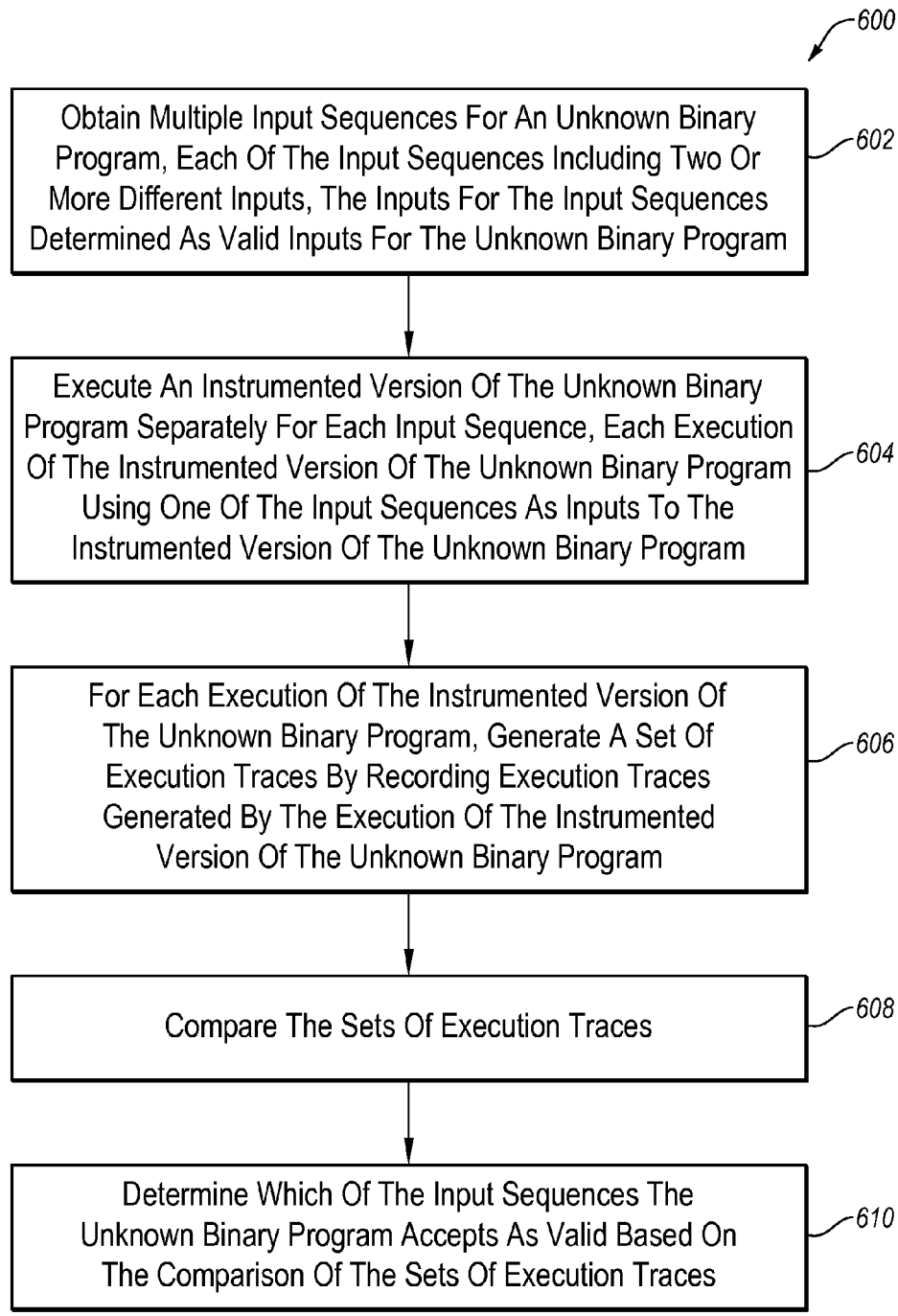
FIG. 6 is a flow chart of an example method to determine valid input sequences for an unknown binary program.

FIG. 6 is a flow chart of another example method 600 to forecast price of a commodity, which may be arranged in accordance with at least one embodiment described herein. The method 600 may be implemented, in some embodiments, by a system, such as the system 500 of FIG. 5. Although illustrated as discrete blocks, various blocks may be divided into additional blocks, combined into fewer blocks, or eliminated, depending on the desired implementation.

The method 600 may begin at block 602, where multiple input sequences for an unknown binary program may be obtained. In some embodiments, each of the input sequences may include two or more different inputs. The inputs may have been previously determined as valid inputs of the unknown binary program. In some embodiments, an input may include a command determined as valid for the unknown binary program and an argument associated with the command. The argument may also have been determined as valid for the unknown binary program. In some embodiments, a last input in each input sequence may be the same.

In block 604, an instrumented version of the unknown binary program may be executed separately for each input sequence. Each execution of the instrumented version of the unknown binary program may use one of the input sequences as inputs to the instrumented version of the unknown binary program.

In block 606, for each execution of the instrumented version of the unknown binary program, a set of execution traces may be generated by recording execution traces generated by the execution of the instrumented version of the unknown binary program. In some embodiments, generating the sets of execution traces may include selecting a portion of the execution traces for each execution of the instrumented version of the unknown binary program for inclusion in the sets of execution traces. In these and other embodiments, the portion of the execution traces selected for the sets of execution traces may be the execution traces generated after last inputs of the input sequences are provided to the unknown binary program.

In some embodiments, the selection of the portion of the execution traces for inclusion in the sets of execution traces may include multiple steps or operation. For example, selecting the portion of the execution traces may include executing the instrumented version of the unknown binary program without any inputs and determining multiple execution traces generated by the execution of the instrumented version of the unknown binary program at an end of the execution without any inputs. In these and other embodiments, the selection of the portion of the execution traces may further include setting the determined multiple execution traces as partition execution traces and selecting the portion of the execution traces, which are generated during execution of the instrumented version of the unknown binary program using the input sequences, based on the portion of the execution traces occurring between a next to last occurrence and a last occurrence of the partition execution traces.

In block 608, the sets of execution traces may be compared. In some embodiments, an execution trace of one of the sets of execution traces may represent a memory address associated with a straight-line block of instructions executed in the unknown binary module that is output by the instrumented version of the unknown binary module and not output by an un-instrumented version of the unknown binary module.

In block 610, it may be determined which of the input sequences the unknown binary program accepts as valid based on the comparison of the sets of execution traces. In some embodiments, when the comparison of the sets of execution traces indicates that the sets of execution traces are the same, none of the input sequences may be determined to be accepted by the unknown binary program. Alternately or additionally, when the comparison of the sets of execution traces indicates that one of the sets of execution traces is different than at least another two of the sets of execution traces that are the same, an input sequence corresponding to the one of the sets of execution traces may be determined to be accepted by the unknown binary program.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 600 may further include generating a control flow graph for each of the sets of execution traces. In these and other embodiments, the comparison of the sets of execution traces may include generating a string representation for each of the control flow graphs and comparing the string representations. In these and other embodiments, generating the string representation for each control flow graphs may include implementing a depth-first search algorithm or breadth first search algorithm.

In some embodiments, a last input in each input sequence may be the same. In these and other embodiments, the multiple input sequences may be one set of input sequences among multiple sets of input sequences that each include multiple input sequences. A last input for each input sequence of each set of the other sets of input sequences may be the same and the last input for each set of input sequences may be different. For example, there may be four sets of input sequences that each include four input sequences. The last input of each input sequence in the first set of input sequences may be the same, the last input of each input sequence in the second set of input sequences may be the same, the last input of each input sequence in the third set of input sequences may be the same, and the last input of each input sequence in the fourth set of input sequences may be the same. The last input of the input sequences in one set of input sequences as compared to the other sets of input sequences may be different. In these and other embodiments, the method 600 may further include performing the acts, step, or operations of the method 600 for each of the sets of input sequences.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads).

While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method to determine valid input sequences for an unknown binary program, the method comprising:
   obtaining a plurality of input sequences of unknown validity for the unknown binary program, each of the input sequences including two or more different inputs, the inputs for the input sequences determined as valid inputs for the unknown binary program, the unknown binary program being unknown based on source code of the unknown binary program being unavailable;
   executing an instrumented version of the unknown binary program separately for each input sequence, each execution of the instrumented version of the unknown binary program using one of the input sequences as inputs to the instrumented version of the unknown binary program;
   for each execution of the instrumented version of the unknown binary program, generating a set of execution traces by recording execution traces generated by the execution of the instrumented version of the unknown binary program;
   generating at least two control flow graphs for at least two execution traces;
   comparing the sets of execution traces including comparing the at least two control flow graphs with each other; and
   determining which of the plurality of input sequences the unknown binary program accepts as valid based on the comparison of the sets of execution traces, wherein a valid input sequence includes a first input that is a precondition for a subsequent second input in the valid input sequence.

2. The method of claim 1, wherein at least one of the inputs includes a command determined as valid for the unknown binary program and an argument associated with the command, the argument also determined as valid for the unknown binary program.

3. The method of claim 1, wherein generating the sets of execution traces includes selecting a portion of the execution traces for each execution of the instrumented version of the unknown binary program for inclusion in the sets of execution traces, the portion of the execution traces selected for the sets of execution traces being the execution traces generated after last inputs of the input sequences are provided to the unknown binary program.

4. The method of claim 3, wherein selecting the portion of the execution traces for inclusion in the sets of execution traces comprises:
   executing the instrumented version of the unknown binary program without any inputs;
   determining a plurality of the execution traces generated by the execution of the instrumented version of the unknown binary program at an end of the execution without any inputs;
   setting the determined plurality of execution traces as partition execution traces; and
   selecting the portion of the execution traces generated during execution of the instrumented version of the unknown binary program using the input sequences based on the portion of the execution traces occurring between a next to last occurrence and a last occurrence of the partition execution traces.

5. The method of claim 1, wherein comparing the at least two control flow graphs with each other comprises:

generating a string representation for each of the at least two control flow graphs; and comparing the string representations.

6. The method of claim 5, wherein generating the string representation for each of the at least two control flow graphs includes implementing a depth-first search algorithm or breadth first search algorithm.

7. The method of claim 1, wherein an execution trace of one of the sets of execution traces represents a memory address associated with a straight-line block of instructions executed in the unknown binary program that is output by the instrumented version of the unknown binary program and not output by an un-instrumented version of the unknown binary program.

8. The method of claim 7, wherein a last input in each input sequence of the plurality of input sequences is the same and the plurality of input sequences is a set of input sequences, the method further comprising repeating the method of claim 1 for a plurality of other sets of input sequences, wherein a last input for each input sequence of each set of the other sets of input sequences is the same and the last input for each set of input sequences is different from the last input of the other sets of input sequences.

9. The method of claim 1, wherein when the comparison of the sets of execution traces indicates that the sets of execution traces are the same, none of the input sequences are determined to be accepted by the unknown binary program.

10. The method of claim 1, wherein when the comparison of the sets of execution traces indicates that one of the sets of execution traces is different than at least another two of the sets of execution traces that are the same, an input sequence corresponding to the one of the sets of execution traces is determined to be accepted by the unknown binary program.

11. One or more non-transitory computer readable media that include instructions that when executed by one or more processors perform operations to determine valid input sequences for an unknown binary program, the operations comprising:

obtaining a plurality of input sequences of unknown validity for the unknown binary program, each of the input sequences including two or more different inputs, the inputs for the input sequences determined as valid inputs by the unknown binary program, the unknown binary program being unknown based on source code of the unknown binary program being unavailable;

executing an instrumented version of the unknown binary program separately for each input sequence, each execution of the instrumented version of the unknown binary program using one of the input sequences as inputs to the instrumented version of the unknown binary program;

for each execution of the instrumented version of the unknown binary program, generating a set of execution traces by recording execution traces generated by the execution of the instrumented version of the unknown binary program;

generating at least two control flow graphs for at least two execution traces;

comparing the sets of execution traces including comparing the at least two control flow graphs with each other; and determining which of the plurality of input sequences the unknown binary program accepts as valid based on the comparison of the sets of execution traces, wherein a valid input sequence includes a first input that is a precondition for a subsequent second input in the valid input sequence.

12. The one or more non-transitory computer readable media of claim 11, wherein the input includes a command determined as valid for the unknown binary program and an argument associated with the command, the argument also determined as valid for the unknown binary program.

13. The one or more non-transitory computer readable media of claim 11, wherein the operation of generating the sets of execution traces further comprises selecting a portion of the execution traces for each execution of the instrumented version of the unknown binary program for inclusion in the sets of execution traces, the portion of the execution traces selected for the sets of execution traces being the execution traces generated after last inputs of the input sequences are provided to the unknown binary program.

14. The one or more non-transitory computer readable media of claim 13, wherein the operation of selecting the portion of the execution traces for inclusion in the sets of execution traces, further comprises:

executing the instrumented version of the unknown binary program without any inputs;

determining a plurality of the execution traces generated by the execution of the instrumented version of the unknown binary program at an end of the execution without any inputs;

setting the determined plurality of execution traces as partition execution traces; and selecting the portion of the execution traces generated during execution of the instrumented version of the unknown binary program using the input sequences based on the portion of the execution traces occurring between a next to last occurrence and a last occurrence of the partition execution traces.

15. The one or more non-transitory computer readable media of claim 11, wherein comparing the at least two control flow graphs with each other comprises:

generating a string representation for each of the at least two control flow graphs; and comparing the string representations.

16. The one or more non-transitory computer readable media of claim 11, wherein an execution trace of one of the sets of execution traces represents a memory address associated with a straight-line block of instructions executed in the unknown binary program that is output by the instrumented version of the unknown binary program and not output by an un-instrumented version of the unknown binary program.

17. The one or more non-transitory computer readable media of claim 16, wherein a last input in each input sequence of the plurality of input sequences is the same and the plurality of input sequences is a set of input sequences, the operations further comprising repeating the operations of claim 11 for a plurality of other sets of input sequences, wherein a last input for each input sequence of each set of the other sets of input sequences is the same and the last input for each set of input sequences is different from the last input of the other sets of input sequences.

18. The one or more non-transitory computer readable media of claim 11, wherein when the comparison of the sets of execution traces indicates that the sets of execution traces are the same, none of the input sequences are determined to be accepted by the unknown binary program.

19. The one or more non-transitory computer readable media of claim 11, wherein when the comparison of the sets of execution traces indicates that one of the sets of execution traces is different than at least another two of the sets of execution traces that are the same, an input sequence corresponding to the one of the sets of execution traces is determined to be accepted by the unknown binary program.

20. A system to determine valid input sequences for an unknown binary program, the system comprising:
- one or more processors;
- one or more computer readable media configured to store instructions that when executed by the one or more processors perform operations, the operations comprising:
  - obtaining a plurality of input sequences of unknown validity for the unknown binary program, each of the input sequences including two or more different inputs, the inputs for the input sequences determined as valid inputs for the unknown binary program, the unknown binary program being unknown based on source code of the unknown binary program being unavailable;
  - executing an instrumented version of the unknown binary program separately for each input sequence, each execution of the instrumented version of the unknown binary program using one of the input sequences as inputs to the instrumented version of the unknown binary program;
  - for each execution of the instrumented version of the unknown binary program, generating a set of execution traces by recording execution traces generated by the execution of the instrumented version of the unknown binary program;
  - generating at least two control flow graphs for at least two execution traces;
  - comparing the sets of execution traces including comparing the at least two control flow graphs with each other; and
  - determining which of the plurality of input sequences the unknown binary program accepts as valid based on the comparison of the sets of execution traces, wherein a valid input sequence includes a first input that is a precondition for a subsequent second input in the valid input sequence.

* * * * *